(12) United States Patent
Crouse et al.

(10) Patent No.: US 9,545,117 B2
(45) Date of Patent: *Jan. 17, 2017

(54) MICROENCAPSULATED CITRUS PHYTOCHEMICALS AND APPLICATION TO BEVERAGES

(75) Inventors: Jeremy Crouse, Cary, IL (US); Teodoro Rivera, Algonquin, IL (US); Peter S. Given, Jr., Ridgefield, CT (US)

(73) Assignee: TROPICANA PRODUCTS, INC., Brandenton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/364,827

(22) Filed: Feb. 3, 2009

(65) Prior Publication Data
US 2010/0196543 A1 Aug. 5, 2010

(51) Int. Cl.
| | |
|---|---|
| A23L 2/52 | (2006.01) |
| A23L 2/06 | (2006.01) |
| A23L 1/00 | (2006.01) |
| A23L 2/02 | (2006.01) |
| A23L 2/56 | (2006.01) |
| A23L 2/68 | (2006.01) |

(52) U.S. Cl.
CPC ............... *A23L 1/0029* (2013.01); *A23L 2/02* (2013.01); *A23L 2/56* (2013.01); *A23L 2/68* (2013.01); *A23L 27/70* (2016.08); *A23L 33/11* (2016.08); *A23P 10/30* (2016.08); *A23V 2002/00* (2013.01)

(58) Field of Classification Search
CPC ............ A23V 2002/00; A23V 2200/33; A61K 2300/00; A23L 1/304
USPC ........................................................ 426/102
See application file for complete search history.

(56) References Cited

U.S. PATENT DOCUMENTS

| | | |
|---|---|---|
| 4,447,456 A | 5/1984 | Hasegawa |
| 4,479,972 A | 10/1984 | Soukup et al. |
| 4,992,282 A | 2/1991 | Mehansho |
| 5,041,425 A | 8/1991 | Hasegawa et al. |
| 6,086,910 A | 7/2000 | Howard et al. |
| 6,160,007 A | 12/2000 | DeMichele et al. |
| 6,239,114 B1 | 5/2001 | Guthrie et al. |
| 6,251,400 B1 | 6/2001 | Guthrie et al. |
| 6,365,212 B1 | 4/2002 | Mcardle et al. |
| 6,642,277 B1 | 11/2003 | Howard et al. |
| 6,841,181 B2 | 1/2005 | Jager et al. |
| 6,914,073 B2 | 7/2005 | Boulos et al. |
| 6,932,984 B1 | 8/2005 | Babtsov et al. |
| 6,969,530 B1 * | 11/2005 | Curtis et al. .................. 424/489 |
| 2001/0016220 A1 * | 8/2001 | Jager et al. ...................... 426/98 |
| 2001/0055627 A1 | 12/2001 | Guthrie et al. |
| 2002/0006953 A1 | 1/2002 | McGill et al. |
| 2003/0064133 A1 * | 4/2003 | Blatt et al. ....................... 426/72 |
| 2004/0022876 A1 | 2/2004 | Green et al. |
| 2004/0096547 A1 | 5/2004 | Ferruzzi |
| 2005/0249952 A1 | 11/2005 | Vasishtha et al. |
| 2006/0116334 A1 | 6/2006 | Hendrix |
| 2006/0116509 A1 | 6/2006 | Manners et al. |
| 2006/0286259 A1 * | 12/2006 | Hargreaves .................. 426/590 |
| 2007/0117763 A1 | 5/2007 | Guthrie |
| 2007/0237885 A1 | 10/2007 | Jayaprakasha et al. |
| 2008/0090897 A1 | 4/2008 | Steiner et al. |
| 2008/0102132 A2 * | 5/2008 | Giner et al. .................. 424/490 |
| 2008/0213441 A1 | 9/2008 | Ludwig et al. |
| 2009/0004333 A1 | 1/2009 | Nakhasi |

FOREIGN PATENT DOCUMENTS

| | | |
|---|---|---|
| CN | 1917946 A | 2/2007 |
| EP | 1702675 A1 | 9/2006 |
| JP | 2001204425 A | 7/2001 |
| RU | 2073987 | 2/1997 |
| WO | 2008083152 | 7/2008 |

OTHER PUBLICATIONS

Thakur et al., Essential Oils and Terpenes, Chapter 13 of Percutaneous Penetration Enhancers, Taylor and Francis Group p. 159-174 (2006).*
Casagrande et al., Evaluation of Functional Stability of Quercerin as a Raw Material and in Different Topical Formulations by its Antilipoperoxidative Activity, AAPS PharmSciTech 2006; 7 (1) Article 10 (http://www.aapspharmscitech.org).*
Perez-Fons et al, Soluble Flavonoids as functional Ingredients for Beverages, Article FIE—Preview, Sep. 2007, accessed at http://scholar.google.com/scholar?hl=en&Ir=&q=related:IINqKLqORkAJ:scholar.google.com/&um=1&ie=UTF-8&sa=X&ei=Gn9NUO_aManI0QG2voDAAg&ved=0CCEQzwlwAA.*
Laura Perez-Fons et al., "Soluble Flavonoids as Functional Ingredients for Beverages", Monteloeder—New Developments in Nutraceuticals, Article FIE-Preview, Sep. 2007, pp. 1-4.
Amit Roy and Shailendra Saraf, "Limonoids: Overview of Significant Bioactive Triterpenes Distributed in Plants Kingdom", Biol. Pharm. Bull, Feb. 2006, 29(2), pp. 191-201.
Manners G D, "Citrus limonoids:analysis bioactivity, and biomedical prospects." Journal of Agricultural and Food Chemistry, vol. 5, No. 21, 2007, p. 8285, XP002581660.
Nantz M P, et al., "Immunity and Antioxidant capacity in humans is enhanced by consumption of a dried, encapsulated fruit and vegetable juice concentrate." Journal of Nutrition, vol. 136, No. 10, 2006, p. 2606, XP002581661.

(Continued)

*Primary Examiner* — D. Lawrence Tarazano
*Assistant Examiner* — Philip DuBois
(74) *Attorney, Agent, or Firm* — James R. Gourley; Colin P. Cahoon; Carstens & Cahoon, LLP

(57) ABSTRACT

Methods are disclosed for fortifying a beverage with one or more citrus phytochemicals while concealing the bitter taste of these compounds in the beverage. These methods comprise microencapsulating the citrus phytochemicals and adding the microencapsulated citrus phytochemicals to beverages. Also disclosed are beverages fortified with one or more microencapsulated citrus phytochemicals but which do not have the bitter taste characteristics of these compounds.

16 Claims, No Drawings

(56) References Cited

OTHER PUBLICATIONS

International Search Report (ISR) and Written Opinion of the International Searching Authority issued Jun. 2, 2010 in corresponding International Application No. PCT/US2010/022816.
International Preliminary Report on Patentability issued for corresponding PCT/US2010/022816 dated Aug. 18, 2011.
International Preliminary Report on Patentability issued for related PCT/US2010/022785 dated Aug. 18, 2011.
International Search Report and Written Opinion issued for related PCT/US2010/022785 dated Jun. 14, 2010.
International Preliminary Report on Patentability issued for related PCT/US2010/022791 dated Aug. 18, 2011.
International Search Report and Written Opinion issued for related PCT/US2010/022791 dated Jun. 14, 2011,
International Preliminary Report on Patentability issued for related PCT/US2010/022823 dated Aug. 18, 2011.
International Search Report and Written Opinion issued for related PCT/US2010/022823 dated Jun. 4, 2010.
Shireffs S M, "The optimal sports drink" School of Sport and Exercise Sciences, University of Loughborough, Loughborough, United Kingdom, vol. 51, No. 1, 2003, p. 25-29.
English Abstract of JP2001204425.
Second Office Action dated Dec. 6, 2012, issued for corresponding Australian Patent Application No. 2010210750.
Second Office Action dated Oct. 29, 2012, issued for corresponding Mexican Patent Application No. MX/a/2011/008166.
Reporting letter dated Jan. 2, 2013, providing a summary of the second Mexican Office Action issued in corresponding Mexican Patent Application No. MX/a/2011/008166. This document was provided by the Applicant's foreign associate and the paragraphs providing legal counsel regarding the second Office Action have been redacted.
Second Office Action issued for corresponding Chinese Patent Application No. 201080011677.5, notification date Dec. 28, 2012.
Search Report dated Dec. 28, 2012, issued for corresponding Chinese Patent Application No. 201080011677.5.
English translation of second Office Action issued for corresponding Chinese Patent Application No. 201080011677.5. This document was provided by the Applicant's foreign associate.
Wu, et al., "The Preparation of Quercetin Microencapsule and its Antioxidation in Oils", Food Industry, 2005, pp. 27-29.
Xie, Gongyun, "Studies on the Extraction and the Microcapsule of Essential Oil of Pomelo Peel", Chinese Selected Master's Thesis from Jimei University (Fujian Province, China), 2008.
First Examiner's Report issued in corresponding Australian Patent Application No. 2010210750, dated Jul. 26, 2012.
English translation of First Office Action issued for corresponding Chinese Patent Application No. 201080011677.5 This document was provided by the Applicant's foreign associate.
First Office Action issued for corresponding Chinese Patent Application No. 201080011677.5, notification date Jul. 31, 2012.
Office Action issued for corresponding Canadian Patent Application No. 2,752,571, dated Sep. 12, 2012.
First Office Action issued for corresponding Mexican Patent Application No. MX/a/2011/008166, dated Jul. 13, 2012.

* cited by examiner

MICROENCAPSULATED CITRUS PHYTOCHEMICALS AND APPLICATION TO BEVERAGES

TECHNICAL FIELD

The present invention relates to beverages and methods for making beverages. In particular, this invention relates to beverages fortified with citrus phytochemicals which have been microencapsulated to conceal their bitter taste.

BACKGROUND

Consumer demand is increasing for food and beverage products fortified with functional ingredients that provide health benefits. Phytochemicals derived from fruits, vegetables, and other plants are currently being researched for their potential medicinal and general health-promoting properties. For example, flavonoids and limonoids are reported to provide health benefits. Citrus phytochemicals derived from citrus fruits are also of interest for their growing list of health benefits. However beverages, for example, juice beverages, have not been fortified with citrus phytochemicals (e.g., citrus flavonoids and citrus limonoids) largely because some of these compounds would impart bitterness at elevated concentrations, and so would provide an unpleasant taste experience. In fact, conventional juice stream processing for citrus juice manufacture actively minimizes transfer of flavonoids and limonoids from the citrus peel and seeds to the juice in order to avoid adding bitterness to the juice. Citrus flavonoids and citrus limonoids are kept below certain low levels in the juice stream through controlled process manufacturing practices, for example, limited pressure during extraction of the juice from the citrus fruit, thermal treatment, enzymatic degradation of flavonoids and limonoids, resin filtration to remove flavonoids and limonoids, and blending of more bitter juice batches with less bitter juice batches.

It is therefore an object of the present invention to provide a method for fortifying a beverage with one or more citrus phytochemicals while concealing the bitter taste of these compounds in the beverage. It is also an object of the present invention to provide beverages fortified with one or more citrus phytochemicals but which do not have the bitter taste characteristics of these compounds. These and other objects, features, and advantages of the invention or certain embodiments of the invention will be apparent to those skilled in the art from the following disclosure and description of exemplary embodiments.

SUMMARY

In accordance with a first aspect of the invention, a beverage is provided which comprises citrus juice and at least one microencapsulated citrus phytochemical composition comprising a citrus phytochemical which contributes at least 60% by weight (e.g., at least 80% by weight, at least 95% by weight) of the total amount of citrus phytochemical in the microencapsulated citrus phytochemical composition. As used herein, a citrus juice comprises juice from one or more citrus fruits. The beverage contains unencapsulated hesperidin in the range of 0-90 mg per 8 oz serving, unencapsulated naringin in the range of 0-150 mg per 8 oz serving, and unencapsulated limonin in the range of 0-0.9 mg per 8 oz serving. In certain exemplary embodiments, the amount of each microencapsulated citrus phytochemical in the beverage is greater than the unencapsulated amount of that citrus phytochemical in the beverage. In certain exemplary embodiments, the microencapsulated citrus phytochemical composition comprises at least one of a citrus flavonoid and a citrus limonoid, and optionally comprises a tocopherol. In certain exemplary embodiments, the citrus flavonoid comprises at least one of hesperidin, hesperetin, neohesperidin, naringin, naringenin, quercetin, quercitrin, rutin, tangeritin, narirutin, nobiletin, poncirin, scutellarein, and sinensetin. In certain exemplary embodiments, the citrus limonoid comprises at least one of limonin, obacunone, nomilin, and glucosides of any of them.

In accordance with a second aspect of the invention, a juice beverage is provided which comprises orange juice, a microencapsulated citrus phytochemical composition comprising microencapsulated hesperidin and microencapsulated limonin, wherein the hesperidin contributes at least 60% by weight (e.g., at least 80% by weight, at least 95% by weight) of the total amount of citrus phytochemical in the microencapsulated citrus phytochemical composition. The juice beverage contains unencapsulated hesperidin in the range of 0-90 mg per 8 oz serving, and unencapsulated limonin in the range of 0-0.9 mg per 8 oz serving. The amount of microencapsulated hesperidin in the juice beverage of the embodiment of this aspect of the invention is 2 to 20 times greater (e.g., 5 to 15 times greater, 8 to 12 times greater, about 10 times greater) than the amount of unencapsulated hesperidin. The amount of microencapsulated limonin in the juice beverage of the embodiment of this aspect of the invention is 2 to 20 times greater (e.g., 5 to 15 times greater, 8 to 12 times greater, about 10 times greater) than the amount of unencapsulated limonin.

In accordance with another aspect, a juice beverage is provided which comprises grapefruit juice, a microencapsulated citrus phytochemical composition comprising microencapsulated naringin and microencapsulated limonin, wherein the naringin contributes at least 60% by weight (e.g., at least 80% by weight, at least 95% by weight) of the total amount of citrus phytochemical in the microencapsulated citrus phytochemical composition. The juice beverage contains unencapsulated naringin in the range of 0-150 mg per 8 oz serving, and unencapsulated limonin in the range of 0-3.0 mg per 8 oz serving. The amount of microencapsulated naringin in the juice beverage of the embodiment of this aspect of the invention is 2 to 20 times greater (e.g., 5 to 15 times greater, 8 to 12 times greater, about 10 times greater) than the amount of unencapsulated naringin. The amount of microencapsulated limonin in the juice beverage of the embodiment of this aspect of the invention is 2 to 20 times greater (e.g., 5 to 15 times greater, 8 to 12 times greater, about 10 times greater) than the amount of unencapsulated limonin.

In accordance with another aspect, a method is provided for preparing a beverage comprising the steps of providing at least one citrus phytochemical composition comprising a citrus phytochemical which contributes at least 60% by weight (e.g., at least 80% by weight, at least 95% by weight) of the total amount of citrus phytochemical in the citrus phytochemical composition, microencapsulating the citrus phytochemical composition, and mixing the microencapsulated citrus phytochemical composition with citrus juice, so that the beverage contains unencapsulated hesperidin in the range of 0-90 mg per 8 oz serving, unencapsulated naringin in the range of 0-150 mg per 8 oz serving, unencapsulated limonin in the range of 0-0.9 mg per 8 oz serving; and so that the amount of each microencapsulated citrus phytochemical is greater than the unencapsulated amount of that citrus phytochemical in the beverage. In certain exemplary embodiments, the step of microencapsulating the citrus phytochemical comprises at least one of core-shell encapsulation, complex coacervation, liposome formation, double encapsulation, spray-drying, and centrifugal extrusion.

In accordance with another aspect, a method is provided for preparing a beverage comprising the steps of providing at least one microencapsulated citrus phytochemical composition comprising a citrus phytochemical which contributes at least 60% by weight (e.g., at least 80% by weight, at least 95% by weight) of the total amount of citrus phytochemical in the microencapsulated citrus phytochemical composition, and mixing the microencapsulated citrus phytochemical composition with citrus juice, so that the beverage contains unencapsulated hesperidin in the range of 0-90 mg per 8 oz serving, unencapsulated naringin in the range of 0-150 mg per 8 oz serving, unencapsulated limonin in the range of 0-0.9 mg per 8 oz serving; and so that the amount of each microencapsulated citrus phytochemical is greater than the unencapsulated amount of that citrus phytochemical in the beverage.

DETAILED DESCRIPTION

Flavonoids are members of a class of polyphenols commonly found in fruits, vegetables, tea, wine, and dark chocolate. Flavonoids typically are categorized according to their chemical structure into the following subgroups: flavones, isoflavones, flavan-3-ols (otherwise known as flavanols), and anthocyanidins. Citrus fruits are an especially rich source of flavonoids, particularly flavones. Examples of flavones derived from citrus fruits include, but are not limited to, hesperetin, hesperidin, neohesperidin, quercetin, quercitrin, rutin, tangeritin, nobiletin, narirutin, naringin, naringenin, poncirin, sculellarein, and sinensetin. Flavones are characterized by a backbone structure (polyphenolic hydroxyl substitutents not shown) according to Formula I, having a phenyl group at the 2-position a carbonyl at the 4-position, and optionally a hydroxyl, ether, or ester substituent at the 3 position.

Formula I

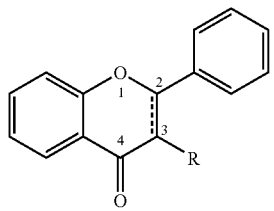

Limonoids are a class of triterpenes most commonly found in plants of the Rutaceae and Meliaceae families, particularly in citrus fruits and the neem tree. Examples of citrus limonoids include, but are not limited to, limonin, obacunone, nomilin, deacetylnomilin, and glycoside derivatives of any of them. Limonoids consist of variations on a furanolactone polycyclic core structure, having four fused six-membered rings with a furan ring. The structure of limonin, an exemplary citrus limonoid, is shown below as Formula II.

Formula II

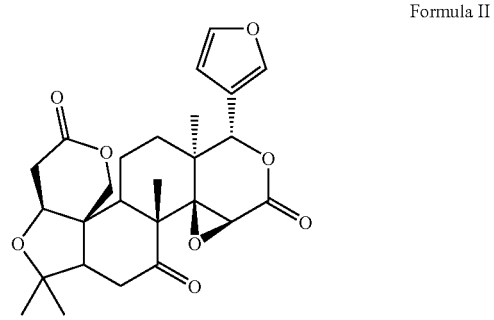

The present invention relates generally to fortification of beverages with citrus phytochemicals, wherein the bitter taste of most or all of the citrus phytochemicals has been concealed by microencapsulation. As used herein, a "citrus phytochemical" is any chemical compound derived from citrus fruit that may provide potential health benefits when consumed by or administered to humans. Citrus phytochemicals "derived" from citrus fruit include phytochemicals extracted or purified from one or more citrus fruits, synthetically produced phytochemicals having the same structural formulae as those naturally found in citrus fruits, and derivatives thereof (e.g., glycosides, aglycones, and any other chemically modified structural variants thereof). In certain exemplary embodiments, citrus phytochemicals include, but are not limited to, citrus flavonoids and citrus limonoids, and may be derived from citrus fruits, for example, orange, mandarin orange, blood orange, tangerine, clementine, grapefruit, lemon, rough lemon, lime, leech lime, tangelo, pomelo, pummelo, or any other citrus fruit. The terms "citrus flavonoid" and "citrus limonoid" as used herein comprise flavonoids and limonoids derived from citrus fruits, including flavonoids and limonoids extracted or purified from citrus fruit, synthetically produced flavonoids and limonoids having the same structural formulae as those naturally found in citrus fruits, and derivatives thereof (e.g., glycosides, aglycones, and any other chemically modified structural variants thereof). Citrus flavonoids include, but are not limited to, hesperidin, hesperetin, neohesperidin, naringin, naringenin, narirutin, nobiletin, quercetin, quercitrin, rutin, tangeritin, poncirin, scutellarein, and sinensetin. Citrus limonoids include, but are not limited to, limonin, obacunone, nomilin, deacetylnomilin, and glycosides of any of them.

According to the present invention, the bitter taste of citrus phytochemicals is concealed by microencapsulation. Microencapsulation sequesters the citrus phytochemicals and prevents them from interacting with taste receptors in the mouth and tongue. The citrus phytochemicals are substantially not released from microencapsulation in the mouth, but are released further down the gastrointestinal tract, for example, in the small intestine. Thus, when a beverage fortified with microencapsulated citrus phytochemicals is consumed, the consumer receives the health benefits of citrus phytochemicals without having to endure the bitter taste of these compounds. Microencapsulation of citrus phytochemicals provides the additional advantages of protecting the citrus phytochemicals from oxidation, heat damage, light damage, and other forms of degradation during processing and storage. Furthermore, a beverage comprising at least one microencapsulated citrus phytochemical may provide greater bioavailablity of the (microencapsulated) citrus phytochemical than an equivalent beverage comprising the same amount of that citrus phytochemical unencapsulated. Amounts of microencapsulated citrus phytochemical disclosed herein refer to the amount of citrus phytochemical and do not include the amount of encapsulant. "The same amount of that citrus phytochemical unencapsulated" includes the amount of microencapsulated citrus phytochemical minus the amount of encapsulant, and also includes any unencapsulated citrus phytochemical that may be present in the beverage comprising at least one microencapsulated citrus phytochemical. Microencapsulation protects the citrus phytochemical to a degree from degradation in the upper gastrointestinal tract, e.g., the mouth and the stomach, and so allows a larger amount of citrus phytochemical to pass into the intestines and be absorbed by the body.

In certain exemplary embodiments, the microencapsulated citrus phytochemical comprises at least one of a citrus flavonoid and a citrus limonoid. In those exemplary embodiments having more than one microencapsulated citrus phytochemical, for example, more than one citrus flavonoid, more than one citrus limonoid, or a combination of a citrus flavonoid and a citrus limonoid, each citrus phytochemical may be microencapsulated separately in separate particles, or multiple citrus phytochemicals may be mixed together and microencapsulated together in the same particle. For example, a citrus flavonoid and a citrus limonoid may be microencapsulated separately in separate particles, or a citrus flavonoid and a citrus limonoid may be mixed together and microencapsulated in the same particle. In another example, where multiple citrus flavonoids are included, each citrus flavonoid may be separately microencapsulated in separate particles, or the multiple citrus flavonoids may be mixed together and microencapsulated in the same particle. In another example, where multiple citrus limonoids are included, each citrus limonoid may be separately microencapsulated in separate particles, or the multiple citrus limonoids may be mixed together and microencapsulated in the same particle. In certain exemplary embodiments, the microencapsulated citrus phytochemical composition comprises one or more of other functional ingredients, weighting agents, carriers, emulsifiers, and preservatives. Certain exemplary embodiments comprise at least one citrus flavonoid and a tocopherol microencapsulated together in the same particle, or at least one citrus limonoid and a tocopherol microencapsulated together, or a combination of a citrus flavonoid, a citrus limonoid, and a tocopherol microencapsulated together. Tocopherols are forms of Vitamin E, occurring as alpha-, beta-, gamma-, and delta-tocopherol, determined by the number and position of methyl groups on the aromatic ring. Tocopherols provide health benefits as antioxidants, and when included in the microencapsulated citrus phytochemical, may also prevent oxidative degradation of the citrus phytochemical. In certain exemplary embodiments, the microencapsulated citrus phytochemical comprises a tocopherol in an amount of about 0.01 wt. % to about 1.0 wt. % of the total weight of the microencapsulated citrus phytochemical (e.g., 0.05 wt. % to 0.5 wt. %, about 0.1 wt. %).

As used herein, the term "microencapsulated citrus phytochemical" includes core-shell encapsulation, comprising particles having a core comprising one or more citrus phytochemicals and a shell of encapsulant material. Core-shell encapsulation may also include particles having multiple cores and/or multiple shells and/or agglomerated core-shell particles. Core-shell encapsulation can be produced by a variety of means including, for example, coacervation, centrifugal extrusion, solvent evaporation, spinning disk, electro-hydrodynamic spraying, spray drying, fluidized bed coating, etc.) As used herein, the term "microencapsulated citrus phytochemical" may also include citrus phytochemicals microencapsulated in coacervates (e.g., complex coacervates), liposomes (e.g., lecithin encapsulant), nanoporous structures (e.g., cellulose particles, silica particles, kaolin, cyclodextrins), liquid crystalline structures (e.g., phospholipids, monoglycerides), natural encapsulants (e.g., yeast, fungal spores, pollen, or inclusion particles (e.g., particles of gelling polymer).

As used herein, the term "microencapsulated citrus phytochemical" includes particles having an average particle size in the micron/micrometer/μm range. In certain exemplary embodiments, microencapsulated citrus phytochemicals have an average particle size in the range of about 1 to about 500 microns (e.g., 5 to 300 microns, 10 to 200 microns, 20 to 150 microns, 50 to 100 microns, 10 to 50 microns). In certain exemplary embodiments, microencapsulated citrus phytochemicals have an average particle size in the range of about 0.05 microns to 20 microns (e.g., 0.1 to 10 microns, 0.5 to 2.0 microns). In certain exemplary embodiments, microencapsulated citrus phytochemicals have an average particle size of less than 1.0 micron (e.g., 0.05 to 0.9 microns, 0.1 to 0.5 microns). In view of this disclosure, the skilled artisan will be able to vary the particle size as necessary to be optimally included in a particular beverage product. Particle size may be selected based on the desired mouthfeel, visual appearance (e.g., clear, hazy, cloudy, or opaque), oxidation stability, and suspension stability within the beverage.

In certain exemplary embodiments, the microencapsulated citrus phytochemical comprises an encapsulant comprising at least one of a protein and a polysaccharide. Exemplary proteins include, but are not limited to, dairy proteins, whey proteins, caseins and fractions thereof, gelatin, corn zein protein, bovine serum albumin, egg albumin, grain protein extracts (e.g. protein from wheat, barley, rye, oats, etc.) vegetable proteins, microbial proteins, legume proteins, proteins from tree nuts, and proteins from ground nuts. Exemplary polysaccharides include but are not limited to pectin, carrageenan, alginate, xanthan gum, modified celluloses (e.g., carboxymethylcellulose) gum acacia, gum ghatti, gum karaya, gum tragacanth, locust bean gum, guar gum, psyllium seed gum, quince seed gum, larch gum (e.g., arabinogalactans), stractan gum, agar, furcellaran, modified starches, gellan gum, and fucoidan.

Certain exemplary beverage embodiments according to the present invention comprise at least one citrus juice and at least one microencapsulated citrus phytochemical composition comprising a citrus phytochemical which contributes at least 60% by weight (e.g., at least 70% by weight, at least 80% by weight, at least 90% by weight, at least 95% by weight, at least 98% by weight) of the total amount of citrus phytochemical in the microencapsulated citrus phytochemical composition. In certain exemplary embodiments, the beverage also contains unencapsulated hesperidin in the range of 0-90 mg per 8 oz serving, unencapsulated naringin in the range of 0-150 mg per 8 oz serving, and unencapsulated limonin in the range of 0-0.9 mg per 8 oz serving. In certain exemplary embodiments, the amount of unencapsulated hesperidin is in the range of 0-60 mg per 8 oz serving of the beverage. In certain exemplary embodiments, the amount of unencapsulated naringin is in the range of 0-120 mg per 8 oz serving of the beverage. In certain exemplary embodiments, the amount of unencapsulated limonin is in the range of 0-0.9 mg per 8 oz serving of the beverage. Beverages according to certain exemplary embodiments of the present invention are fortified with microencapsulated citrus phytochemicals, so that the amount of each microencapsulated citrus phytochemical in the beverage is greater than the unencapsulated amount of that citrus phytochemical in the beverage. As used herein, the "amount of microencapsulated citrus phytochemical" does not include the amount of encapsulant or any other substance in the citrus phytochemical composition that is not a citrus phytochemical, but only refers to the amount of citrus phytochemical that is microencapsulated. In certain exemplary embodiments, the amount of each microencapsulated citrus phytochemical is at least two times greater than the unencapsulated amount of that citrus phytochemical in the beverage (e.g., 2 to 20 times greater, 5 to 15 times greater, 8 to 12 times greater, about 10 times greater). In certain exemplary embodiments, the amount of the at least one microencapsulated citrus phytochemical is greater than about 1 mg per 8 oz serving of the beverage (e.g., from about 125 mg to about 2000 mg per 8 oz serving, from about 500 mg to about 1000 mg per 8 oz serving, from about 300 mg to about 700 mg per 8 oz serving, from about 125 mg to about 500 mg per 8 oz serving, from about 60 mg to about 90 mg per 8 oz serving). In certain exemplary embodiments, the amount of microencapsulated citrus limonoid is at least about 1 mg per 8 oz serving of the beverage (e.g., from about 2 mg to about 200 mg per 8 oz serving, from about 10 mg to about 100 mg per 8 oz serving). In certain exemplary embodiments, the amount of microencapsulated citrus flavonoid is from about 125 mg to about 2000 mg per 8 oz serving of the beverage (e.g., from about 500 mg to about 100 mg per 8 oz serving, from about 300 mg to about 700 mg per 8 oz serving). In certain exemplary embodiments, the total amount of unencapsulated citrus phytochemicals in the beverage is at most 100 mg per 8 oz serving, and the total amount of unencapsulated and encapsulated citrus phytochemicals in the beverage is at least 200 mg per 8 oz serving.

In certain exemplary embodiments, the beverage comprises a citrus juice, which may be derived from at least one of orange, mandarin orange, blood orange, tangerine, clementine, grapefruit, lemon, rough lemon, lime, leech lime, tangelo, pummelo, and pomelo, among other citrus fruits. In certain exemplary embodiments, the citrus juice is a not-from-concentrate (NFC) orange juice. In certain exemplary embodiments, the citrus juice is included in the beverage in an amount of at least 10% by weight of the beverage (e.g., at least 25% by weight, at least 50% by weight, at least 75% by weight, at least 90% by weight). In certain exemplary embodiments, the beverage further comprises a non-citrus juice, which may be derived from at least one of apple, grape, pear, peach, nectarine, apricot, plum, prune, pomegranate, blackberry, blueberry, raspberry, strawberry, cherry, cranberry, currant, gooseberry, boysenberry, huckleberry, mulberry, date, pineapple, banana, papaya, mango, lychee, passionfruit, coconut, guava, kiwi, watermelon, cantaloupe, and honeydew melon. Optionally, the non-citrus juice may comprise at least one vegetable juice.

It should be understood that beverages in accordance with this disclosure may have any of numerous different specific formulations or constitutions. The formulation of a beverage in accordance with this disclosure can vary to a certain extent, depending upon such factors as the beverage's intended market segment, its desired nutritional characteristics, flavor profile and the like. For example, it will generally be an option to add further beverage ingredients to the formulation of a particular beverage embodiment, including any of the beverage formulations described herein. Other additional beverage ingredients are also contemplated and within the scope of the invention.

In certain exemplary embodiments, the beverage may further comprise at least one additional beverage ingredient (e.g., water, carbonation, a sweetener, an acidulant, a flavorant, a colorant, a vitamin, a mineral, a preservative, an emulsifier, a thickening agent, and mixtures of any of them). Other ingredients are also contemplated. The additional beverage ingredients may be added at various points during beverage production, including before or after addition of the microencapsulated citrus phytochemical composition.

In certain exemplary embodiments, the beverage maybe be at least one of a carbonated soft drink, a non-carbonated soft drink, an energy drink, a health drink, a fountain beverage, a frozen ready-to-drink beverage, a coffee beverage, a tea beverage, a dairy beverage, a fruit juice, a fruit-flavored drink, and an alcoholic beverage.

The beverages disclosed herein include ready-to-drink liquid formulations, beverage concentrates, and the like. At least certain exemplary embodiments of the beverage concentrates contemplated are prepared with an initial volume of juice or juice concentrate to which the additional ingredients are added. Full strength beverage compositions can be formed from the beverage concentrate by adding further volumes of water to the concentrate. In certain other embodiments, a full strength beverage is directly prepared without the formation of a concentrate and subsequent dilution.

Added water can be used in the manufacture of certain embodiments of the beverage, and water of a standard beverage quality can be employed in order not to adversely affect beverage taste, odor, or appearance. The water typically will be clear, colorless, free from objectionable minerals, tastes and odors, free from organic matter, low in alkalinity and of acceptable microbiological quality based on industry and government standards applicable at the time of producing the beverage. In certain exemplary embodiments, added water is present at a level of from about 0% to about 90% by weight of the full strength beverage (e.g., from about 10% to about 75% by weight, from about 25% to about 50% by weight).

Carbonation may be used to provide effervescence to certain exemplary embodiments of the beverages disclosed herein. Any of the techniques and carbonating equipment known in the art for carbonating beverages, that is, dissolving carbon dioxide into beverages, can be employed. Carbonation can enhance the beverage taste and appearance and can aid in preserving the beverage by inhibiting the growth and/or destroying objectionable bacteria. In certain exemplary embodiments, the beverage has a carbon dioxide level up to about 7.0 volumes carbon dioxide, e.g., from about 0.5 to about 5.0 volumes of carbon dioxide. As used herein, one volume of carbon dioxide is defined as the amount of carbon dioxide absorbed by any given quantity of water at 60° F. (16° C.) and atmospheric pressure. The carbon dioxide content in the beverage can be selected by those skilled in the art based on the desired level of effervescence and the impact of the carbonation on the taste and mouthfeel of the beverage.

Certain exemplary embodiments of the beverage products disclosed herein include at least one sweetener as an additional beverage ingredient. Sweeteners may be natural or artificial. Natural sweeteners include but are not limited to sucrose, fructose, glucose, maltose, rhamnose, tagatose, trehalose, corn syrups (e.g., high fructose corn syrup), fructo-oligosaccharides, invert sugar, maple syrup, maple sugar, honey, brown sugar, molasses, sorghum syrup, erythritol, sorbitol, mannitol, xylitol, glycyrrhizin, malitol, lactose, Lo Han Guo ("LHG"), rebaudiosides (e.g., rebaudioside A), stevioside, xylose, arabinose, isomalt, lactitol, maltitol, and ribose, thaumatin, monellin, brazzein, and monetin, and mixtures of any of them. In certain exemplary embodiments, the natural sweetener is a natural potent non-nutritive sweetener, for example rebaudioside A. Artificial sweeteners include but are not limited to aspartame, saccharin, sucralose, acesulfame potassium, alitame, cyclamate, neohesperidin dihydrochalcone, neotame, and mixtures of any of them. The amount of sweetener used in the beverage can be selected by those skilled in the art based on the sweetness intensity desired in the beverage.

In certain exemplary embodiments, the beverage products disclosed here comprise an acidulant as an additional beverage ingredient. Acidulants include but are not limited to phosphoric acid, hydrochloric acid, citric acid, tartaric acid, malic acid, lactic acid, adipic acid, ascorbic acid, fumaric acid, gluconic acid, succinic acid, maleic acid, and mixtures of any of them. Certain exemplary embodiments comprise at least one acidulant used in an amount, collectively, of from about 0.01% to about 1.0% by weight of the beverage (e.g., from about 0.1% to about 0.75% by weight, from about 0.25% to about 0.5% by weight). The amount of acidulant used in the beverage can be selected by those skilled in the art based on the acidulant used, the desired pH, other ingredients used, etc.

In certain exemplary embodiments, the beverage products disclosed here comprise a flavorant as an additional beverage ingredient. Flavorants include fruit flavors, botanical flavors, and spice flavors, among others. Flavorants can be in the form of an extract, essential oil, oleoresin, juice concentrate, bottler's base, or other forms known in the art. Fruit flavors include but are not limited to flavors derived from the fruits disclosed above for fruit juices. Botanical flavor refers to flavors derived from parts of a plant other than the fruit. As such, botanical flavors can include those flavors derived from essential oils and extracts of nuts, bark, roots and leaves. Examples of such flavors include cola flavor, tea flavor, coffee flavor, among others. Spice flavors include but are not limited to flavors derived from cassia, clove, cinnamon, pepper, ginger, vanilla, cardamom, coriander, root beer, sassafras, ginseng, and others. Numerous additional and alternative flavorings suitable for use in at least certain exemplary embodiments will be apparent to those skilled in the art given the benefit of this disclosure. In at least certain exemplary embodiments, such spice or other flavors compliment that of a fruit juice or juice combination. It will be within the ability of those skilled in the art, given the benefit of this disclosure, to select a suitable flavorant or combination of flavorants for beverages according to this disclosure.

In certain exemplary embodiments, the beverage products disclosed here comprise a vitamin and/or a mineral as an additional beverage ingredient. Examples of vitamins include, but are not limited to, Vitamins A, C (ascorbic acid), D, E (tocopherol/tocotrienol), $B_1$ (thiamine), $B_2$ (riboflavin), $B_3$ (niacin), $B_5$, $B_6$, $B_7$ (biotin), $B_9$ (folic acid), $B_{12}$, and K, and combinations of any of them. Examples of minerals include, but are not limited to, sodium, potassium, calcium, magnesium, chloride, and combinations of any of them. It will be within the ability of those skilled in the art, given the benefit of this disclosure, to select a suitable vitamin, mineral, or combination thereof for beverages according to this disclosure.

Preservatives may be used in at least certain embodiments of the beverages disclosed here. That is, at least certain exemplary embodiments contain an optional dissolved preservative system. Beverages with a pH below 4 and especially those below 3 typically are "microstable," i.e., they resist growth of microorganisms, and so are suitable for longer term storage prior to consumption without the need for further preservatives. However, an additional preservative system can be used if desired. If a preservative system is used, it can be added to the beverage at any suitable time during production, e.g., in some cases prior to the addition of a sweetener. As used here, the terms "preservation system" or "preservatives" include all suitable preservatives approved for use in food and beverage compositions, including, without limitation, such known preservatives as nisin, cinnamic acid, sorbates, e.g., sodium, calcium, and potassium sorbate, benzoates, e.g., sodium and potassium sorbate, citrates, e.g., sodium citrate and potassium citrate, and antioxidants such as ascorbic acid. Preservatives can be used in amounts not exceeding mandated maximum levels under applicable laws and regulations. The level of preservative used typically is adjusted according to the planned final product pH, as well as an evaluation of the microbiological spoilage potential of the particular beverage formulation. The maximum level employed typically is about 0.05% by weight of the beverage. It will be within the ability of those skilled in the art, given the benefit of this disclosure, to select a suitable preservative or combination of preservatives for beverages according to this disclosure.

Other methods of beverage preservation suitable for at least certain exemplary embodiments of the beverages disclosed here include, e.g., heat treatment or thermal processing steps, such as hot filling and tunnel pasteurization. Such steps can be used to reduce yeast, mold and microbial growth in the beverage products. For example, U.S. Pat. No. 4,830,862 to Braun et al. discloses the use of pasteurization in the production of fruit juice beverages as well as the use of suitable preservatives in carbonated beverages. U.S. Pat. No. 4,925,686 to Kastin discloses a heat-pasteurized freezable fruit juice composition which contains sodium benzoate and potassium sorbate.

Certain aspects of the present invention are directed to methods for concealing the bitterness of citrus phytochemicals, and methods for preparing a beverage comprising microencapsulated citrus phytochemicals. In certain exemplary embodiments, a method is provided for concealing the bitterness of citrus phytochemicals comprising the steps of providing at least one citrus phytochemical and microencapsulating the citrus phytochemical. In certain exemplary embodiments, a method for preparing a beverage is provided comprising the steps of providing at least one citrus phytochemical composition comprising a citrus phytochemical which contributes at least 60% by weight (e.g., at least 70% by weight, at least 80% by weight, at least 90% by weight, at least 95% by weight, at least 98% by weight) of the total amount of citrus phytochemical in the citrus phytochemical composition, microencapsulating the citrus phytochemical composition, and mixing the microencapsulated citrus phytochemical composition with citrus juice to form the beverage. The beverage contains unencapsulated hesperidin in the range of 0-90 mg per 8 oz serving, unencapsulated naringin in the range of 0-150 mg per 8 oz serving, unencapsulated limonin in the range of 0-0.9 mg per 8 oz serving; and the amount of each microencapsulated citrus phytochemical is greater than the unencapsulated amount of that citrus phytochemical in the beverage. In certain exemplary embodiments, the amount of unencapsulated hesperidin is in the range of 0-60 mg per 8 oz serving of the beverage. In certain exemplary embodiments, the amount of unencapsulated naringin is in the range of 0-120 mg per 8 oz serving of the beverage. In certain exemplary embodiments, the amount of unencapsulated limonin is in the range of 0-0.7 mg per 8 oz serving of the beverage. In certain exemplary embodiments, the amount of each microencapsulated citrus phytochemical is at least two times greater than the unencapsulated amount of that citrus phytochemical in the beverage (e.g., 2 to 20 times greater, 5 to 15 times greater, 8 to 12 times greater, about 10 times greater). In certain exemplary embodiments, the amount of the at least one microencapsulated citrus phytochemical is greater than about 1 mg per 8 oz serving of the beverage (e.g., from about 125 mg to about 2000 mg per 8 oz serving, from about 500 mg to about 1000 mg per 8 oz serving, from about 300 mg to about 700 mg per 8 oz serving, from about 125 mg to about 500 mg per 8 oz serving, from about 60 mg to about 90 mg per 8 oz serving).

In certain exemplary embodiments, a method for preparing a beverage is provided comprising the steps of providing at least one microencapsulated citrus phytochemical composition comprising a citrus phytochemical which contributes at least 60% by weight (e.g., at least 70% by weight, at least 80% by weight, at least 90% by weight, at least 95% by weight, at least 98% by weight) of the total amount of citrus phytochemicals in the microencapsulated citrus phytochemical composition, and mixing the microencapsulated citrus phytochemical composition with at least one citrus juice to form the beverage. The beverage contains unencapsulated hesperidin in the range of 0-90 mg per 8 oz serving, unencapsulated naringin in the range of 0-150 mg per 8 oz serving, unencapsulated limonin in the range of 0-0.9 mg per 8 oz serving; and the amount of each microencapsulated citrus phytochemical is greater than the unencapsulated amount of that citrus phytochemical in the beverage. In certain exemplary embodiments, the amount of unencapsulated hesperidin is in the range of 0-60 mg per 8 oz serving of the beverage. In certain exemplary embodiments, the amount of unencapsulated naringin is in the range of 0-120 mg per 8 oz serving of the beverage. In certain exemplary embodiments, the amount of unencapsulated limonin is in the range of 0-0.7 mg per 8 oz serving of the beverage. In certain exemplary embodiments, the amount of each microencapsulated citrus phytochemical is at least two times greater than the unencapsulated amount of that citrus phytochemical in the beverage (e.g., 2 to 20 times greater, 5 to 15 times greater, 8 to 12 times greater, about 10 times greater). In certain exemplary embodiments, the amount of the at least one microencapsulated citrus phytochemical is greater than about 1 mg per 8 oz serving of the beverage (e.g., from about 100 mg to about 2000 mg per 8 oz serving, from about 500 mg to about 1000 mg per 8 oz serving, from about 50 mg to about 700 mg per 8 oz serving, from about 100 mg to about 500 mg per 8 oz serving).

Non-limiting exemplary methods for the step of microencapsulating the citrus phytochemicals include chemical and physical microencapsulation methods. Chemical microencapsulation methods include, but are not limited to, e.g., simple or complex coacervation, solvent evaporation, polymer-polymer incompatibility, in-liquid drying, and desolvation in liquid media. Physical microencapsulation methods include, but are not limited to, e.g., spray drying processes, vibration nozzle, centrifugal extrusion, pressure extrusion, hot melt processes, fluidized bed, air suspension cooling, electrostatic deposition, rotational suspension separation, and spraying solvent extraction bath. In certain exemplary embodiments, microencapsulating the citrus phytochemical comprises a step selected from complex coacervation, spray drying, and centrifugal extrusion.

As used herein, the step of "microencapsulating" includes core-shell microencapsulation, producing particles having a core of one or more citrus phytochemical, dissolved or dispersed in an oil-miscible solvent (e.g., medium chain triglycerides, limonene, benzyl alcohol, etc.) and a shell of encapsulant material. Core-shell encapsulation may also include particles having multiple cores and/or multiple shells and/or agglomerated core-shell particles. Core-shell microcapsules can be produced by a variety of means including, for example, centrifugal extrusion, solvent evaporation, spinning disk, electro-hydrodynamic spraying, spray drying, fluidized bed coating, etc. As used herein, the step of "microencapsulating" may also include encapsulation of citrus phytochemicals in coacervates (e.g., complex coacervates), liposomes (e.g., using lecithin as the encapsulant), nano-porous structures (e.g., inside cellulose particles, silica particles, kaolin, cyclodextrins), liquid crystalline structures (e.g., using phospholipids, monoglycerides), natural encapsulants (e.g., inside yeast, fungal spores, pollen), or inclusion particles (e.g., within particles of gelling polymer, comminuted fruit pieces).

In core-shell encapsulation, the core may also include a gel in addition to the citrus phytochemical, for example, calcium alginate or heat-treated whey protein. The shell may be composed of a wide variety of substances, for example, waxes, fats, shellac, protein (e.g., whey, zein, gelatin, soy, etc.), and/or a hydrocolloid (e.g., starch or modified starch, cellulosics, xanthan, gellan, pectin, etc.). The shell may be designed to respond to a particular physiological or environmental condition to expose the core, thus releasing the microencapsulated citrus phytochemical by diffusion or other means (e.g., acid hydrolysis, enzymatic action, osmotic pressure, concentration gradients, etc.). Core-shell microcapsules can be produced by a variety of means including, for example, coacervation, centrifugal extrusion, solvent evaporation, spinning disk, electro-hydrodynamic spraying, spray drying, fluidized bed coating, etc. Zein protein from corn is a specific example of a shell which can form around an oil-soluble core merely by dilution of the solvent (aqueous alcohol solution) by water. In this manner, a concentrated solution of zein in aqueous alcohol which also contains the encapsulate substance (in this case a citrus phytochemical) forms microcapsules by combining physical agitation (high shear or homogenization), with simultaneous dilution with water.

Coacervates (e.g., complex coacervates) have a shell comprised of two polymers having opposite net charges from each other at the pH of the finished product, e.g., orange juice at 3.2. To produce coacervates, the core material (e.g., a citrus phytochemical dissolved or dispersed in an oil-miscible solvent (e.g., medium chain triglycerides, limonene, benzyl alcohol, etc.)) is surrounded by the first polymer, typically via homogenization or high shear mixing of an oil-soluble substance with a solution of protein (e.g., whey), followed by addition of a second solution of a hydrocolloid (e.g., pectin). The pH is then lowered to the product target pH whereby the protein exhibits a net positive charge and the hydrocolloid exhibits a net negative charge, which by mutual attraction, leads to a polymer complex "shell" around the core called a coacervate. Coacervates may also include "layer-by layer" shell development, whereby layers of positively and negatively charged polymers are alternately added to form thicker and more protective barriers.

Liposomes may comprise an encapsulant that lowers interfacial tension, for example lecithin or components of lecithin (e.g., phospholipids and lyso-phosopholipids), which surrounds a core substance (e.g., a citrus phytochemical dissolved or dispersed in an oil-miscible solvent (e.g., medium chain triglycerides, limonene, benzyl alcohol, etc.)). Liposomes may be formed by the addition of external energy (e.g., homogenization, ultrasonic treatment, or other equivalent energy input mechanisms). Liposomes can be unilamellar or multilamellar, depending on the precise formula and processing parameters. For beverage applications, liposomes preferentially encapsulate oil-soluble components like citrus phytochemicals, as opposed to water-soluble components. Liposome surfaces can be modified by covalent or noncovalent addition of ligands which confer specific binding capabilities to the structure, thus aiding in targeting of the encapsulated substance. Typical surface modifications include addition of an antibody to a cell surface antigen, which dramatically increases the likelihood of the encapsulated substance reaching specific cells (e.g., oral mucosal cells, stomach, or intestinal mucosal cells for beverage and food applications).

Double encapsulation is a combination of some of the technologies described above. An example would be a capsule containing many smaller capsules, with the outer most shell designed to dissolve or disintegrate upon the appropriate stimulus, e.g., wetting in saliva, amylase enzyme activity, mastication (shear), neutral pH, etc. This approach allows multiple encapsulated compounds to be delivered sequentially, assuming the outer most shell and the surface of the inner capsules are triggered either by different mechanisms, or follow each other based on diffusion kinetics timing. Another form of double encapsulation is multiphasic in that it can be an oil-in-water-in-oil double "emulsion," or a water-in-oil-in-water double "emulsion"; the latter being most appropriate for beverage applications where the beverage is the outer most water phase. Double emulsions are constructed inside-out starting with the inner most "emulsion". This requires use of at least two surfactants having widely different HLB values to act at the appropriate interfaces (oil/water as compared to water/oil). As a result, encapsulated substances having either water-solubility or oil-solubility can be encapsulated simultaneously or separately.

Nano-porous particles that naturally contain nano-pores, or are deliberately constructed to contain uniform nano-porous cavities can encapsulate oil-soluble substances (e.g., a citrus phytochemical dissolved or dispersed in an oil-miscible solvent (e.g., medium chain triglycerides, limonene, benzyl alcohol, etc.)) by a combination of capillary action and interfacial attraction. Release is governed by simple diffusion or may require physical shear, pH change, or enzymatic action. Examples of nano-porous encapsulants include cellulose particles, silica particles, or natural clay (Kaolin). On a more molecular level, cyclodextrins could be considered nano-porous materials, in that they encapsulate substances that "fit" the cavity of the ringed cyclodextrin structure, depending upon both the hydrodynamic size of the encapsulated substance, and the size of the ring (there are several different cyclodextrins available).

Sub-micron liquid crystalline structures having a continuous structured phase and a network of nano-pores can be fabricated from edible materials like phospholipids and monoglycerides, when processed at the correct ratio of surfactant, encapsulated substance (e.g., a citrus phytochemical dissolved or dispersed in an oil-miscible solvent (e.g., medium chain triglycerides, limonene, benzyl alcohol, etc.)), and oil/water phase. These liquid crystalline materials are not solid particles but act more like gels or concentrated polymer solutions, yet absorb and release encapsulated substances much like nano-porous particles described above. Though most traditional structures of this definition are too viscous to be considered for beverage applications, broken or fractional liquid crystals have been found to possess equivalent encapsulation properties, but do not have an infinitely extended structure and consequently have lower viscosities.

Natural capsules, like yeast, fungal spores, and pollen, can also encapsulate oil-soluble substances (e.g., a citrus phytochemical dissolved or dispersed in an oil-miscible solvent (e.g., medium chain triglycerides, limonene, benzyl alcohol, etc.)). Each of these natural encapsulants offers different opportunities for protection and release, depending upon the chemical nature of the encapsulated substance and the finished product matrix.

Inclusion particles comprise micron-scale particles prepared by gelling a polymer with an oil-soluble substance (e.g., a citrus phytochemical dissolved or dispersed in an oil-miscible solvent (e.g., medium chain triglycerides, limonene, benzyl alcohol, etc.)) in its matrix during polymerization, e.g., gelling of sodium alginate upon addition of calcium. By this means, oil-soluble substances are entrapped in an aqueous gel until the gel is broken by physical, environmental, or metabolic means.

As used herein, the step of "microencapsulating" produces particles having an average particle size in the micron/micrometer/μm range. In certain exemplary embodiments, the step of microencapsulating citrus phytochemicals produces an average particle size in the range of about 1 to about 500 microns (e.g., 5 to 300 microns, 10 to 200 microns, 20 to 150 microns, 50 to 100 microns, 10 to 50 microns). In certain exemplary embodiments, the step of microencapsulating citrus phytochemicals produce an average particle size in the range of about 0.05 microns to 20 microns (e.g., 0.1 to 10 microns, 0.5 to 2.0 microns). In certain exemplary embodiments, the step of microencapsulating citrus phytochemicals produces an average particle size of less than 1.0 micron (e.g., 0.05 to 0.9 microns, 0.1 to 0.5 microns). In view of this disclosure, the skilled artisan will be able to vary the particle size as necessary to be optimally included in a particular beverage product. Particle size may be selected based on the desired mouthfeel, visual appearance (e.g., clear, hazy, cloudy, or opaque), oxidation stability, and suspension stability within the beverage.

In certain exemplary embodiments, the step of microencapsulating the citrus phytochemical uses an encapsulant comprising at least one of a protein and a polysaccharide. Exemplary proteins include, but are not limited to, dairy proteins, whey proteins, caseins and fractions thereof, gelatin, corn zein protein, bovine serum albumin, egg albumin, grain protein extracts (e.g. protein from wheat, barley, rye, oats, etc.) vegetable proteins, microbial proteins, legume proteins, proteins from tree nuts, and proteins from ground nuts. Exemplary polysaccharides include but are not limited to pectin, carrageenan, alginate, xanthan gum, modified celluloses (e.g., carboxymethylcellulose) gum acacia, gum ghatti, gum karaya, gum tragacanth, locust bean gum, guar gum, psyllium seed gum, quince seed gum, larch gum (e.g., arabinogalactans), stractan gum, agar, furcellaran, modified starches, gellan gum, and fucoidan.

In certain exemplary embodiments of the methods disclosed herein, the citrus phytochemical may be derived from at least one of orange, mandarin orange, blood orange, tangerine, clementine, grapefruit, lemon, rough lemon, lime, leech lime, tangelo, pummelo, and pomelo, among other citrus fruits. In certain exemplary embodiments of the methods disclosed herein, the citrus phytochemical comprises at least one of a citrus flavonoid (e.g., hesperetin, hesperidin, neohesperidin, quercetin, quercitrin, rutin, narirutin, nobiletin, tangeritin, naringin, naringenin, ponciarin, scutellarein, sinensetin) and a citrus limonoid (e.g., limonin, obacunone, nomilin, glycoside derivatives of any of them), and optionally a tocopherol. In certain exemplary embodiments of the methods disclosed herein, the citrus juice may be derived from at least one of orange, mandarin orange, blood orange, tangerine, clementine, grapefruit, lemon, rough lemon, lime, leech lime, tangelo, pomelo, pummelo, and any other citrus fruit. Certain exemplary embodiments of the methods disclosed herein further comprise the step of mixing in an additional beverage ingredient comprises at least one of water, carbonation, a non-citrus juice, a sweetener, an acidulant, a flavorant, a colorant, a vitamin, a mineral, a preservative, an emulsifier, a thickening agent, and a combination of any of them. The non-citrus juice may be derived from at least one of apple, grape, pear, peach, nectarine, apricot, plum, prune, pomegranate, blackberry, blueberry, raspberry, strawberry, cherry, cranberry, currant, gooseberry, boysenberry, huckleberry, mulberry, date, pineapple, banana, papaya, mango, lychee, passionfruit, coconut, guava, kiwi, watermelon, cantaloupe, and honeydew melon. Optionally, the non-citrus juice may comprise at least one vegetable juice.

The following examples are specific embodiments of the present invention but are not intended to limit it.

Example 1

An orange juice beverage is prepared under the following conditions. A citrus phytochemical composition comprising hesperidin and limonin are microencapsulated by complex coacervation in a gelatin/gum acacia shell. The hesperidin contributes at least 60% by weight of the total amount of citrus phytochemical in the microencapsulated citrus phytochemical composition. The microencapsulated hesperidin and microencapsulated limonin are mixed into a not-from-concentrate orange juice having unencapsulated hesperidin in an amount less than 60 mg per 8 oz serving, and also having unencapsulated limonin in an amount less than 0.9 mg per 8 oz serving. The finished orange juice beverage contains unencapsulated hesperidin in the range of 0-60 mg per 8 oz serving, unencapsulated limonin in the range of 0-0.9 mg per 8 oz serving, microencapsulated hesperidin in an amount about 10 times greater than the amount of unencapsulated hesperidin, and microencapsulated limonin in an amount about 10 times greater than the amount of unencapsulated limonin.

Example 2

A grapefruit juice beverage is prepared under the following conditions. A citrus phytochemical composition comprising naringin and limonin are microencapsulated by complex coacervation in a gelatin/gum acacia shell. The naringin contributes at least 60% by weight of the total amount of citrus phytochemical in the microencapsulated citrus phytochemical composition. The microencapsulated naringin and microencapsulated limonin are mixed into a grapefruit juice having unencapsulated naringin in an amount less than 150 mg per 8 oz serving, and also having unencapsulated limonin in an amount less than 3.0 mg per 8 oz serving. The finished grapefruit juice beverage contains unencapsulated naringin in the range of 0-150 mg per 8 oz serving, unencapsulated limonin in the range of 0-3.0 mg per 8 oz serving, microencapsulated naringin in an amount about 10 times greater than the amount of unencapsulated naringin, and microencapsulated limonin in an amount about 10 times greater than the amount of unencapsulated limonin.

Given the benefit of the above disclosure and description of exemplary embodiments, it will be apparent to those skilled in the art that numerous alternative and different embodiments are possible in keeping with the general principles of the invention disclosed here. Those skilled in this art will recognize that all such various modifications and alternative embodiments are within the true scope and spirit of the invention. The appended claims are intended to cover all such modifications and alternative embodiments. It should be understood that the use of a singular indefinite or definite article (e.g., "a," "an," "the," etc.) in this disclosure and in the following claims follows the traditional approach in patents of meaning "at least one" unless in a particular instance it is clear from context that the term is intended in that particular instance to mean specifically one and only one. Likewise, the term "comprising" is open ended, not excluding additional items, features, components, etc.

What is claimed is:

1. A juice beverage comprising:
   orange juice;
   a microencapsulated citrus phytochemical composition comprising microencapsulated hesperidin and microencapsulated limonin, wherein the hesperidin contributes at least 60% by weight of the total amount of citrus phytochemical in the microencapsulated citrus phytochemical composition;
   unencapsulated hesperidin in an amount up to 90 mg per 8 oz serving; and
   unencapsulated limonin in an amount up to 0.9 mg per 8 oz serving;
   wherein the amount of microencapsulated hesperidin is 2-20 times greater than the amount of unencapsulated hesperidin; and
   wherein the amount of microencapsulated limonin is 2-20 times greater than the amount of unencapsulated limonin.

2. The beverage of claim 1 wherein the microencapsulated citrus phytochemical composition comprises an encapsulant shell comprising at least one of protein and a polysaccharide.

3. The beverage of claim 2, wherein the protein comprises at least one of dairy proteins, whey proteins, caseins and fractions thereof, gelatin, corn zein protein, bovine serum albumin, egg albumin, grain protein extracts, wheat protein, barley protein, rye protein, oat protein, vegetable proteins, microbial proteins, legume proteins, proteins from tree nuts, and proteins from ground nuts.

4. The beverage of claim 2, wherein the polysaccharide comprises at least one of pectin, carrageenan, alginate, xanthan gum, modified celluloses, carboxymethylcellulose, chitosan, gum acacia, gum ghatti, gum karaya, gum tragacanth, locust bean gum, guar gum, psyllium seed gum, quince seed gum, larch gum, arabinogalactans, stractan gum, agar, furcellaran, modified starches, gellan gum, and fucoidan.

5. The beverage of claim 1, wherein the microencapsulated citrus phytochemical composition is produced by at least one of core-shell encapsulation, complex coacervation, liposome formation, double encapsulation, centrifugal extrusion, and spray drying.

6. The beverage of claim 1, wherein the microencapsulated citrus phytochemical composition has an average particle size in the range of 1 micron to 500 microns.

7. The beverage of claim 1, wherein the microencapsulated citrus phytochemical composition has an average particle size in the range of 10 micron to 200 microns.

8. The beverage of claim 1, wherein the orange juice comprises not-from-concentrate orange juice.

9. The beverage of claim 1, wherein the orange juice is included in an amount of at least 50% by weight of the beverage.

10. The beverage of claim 1, wherein the orange juice is included in an amount of at least 90% by weight of the beverage.

11. A juice beverage comprising:
grapefruit juice;
a microencapsulated citrus phytochemical composition comprising microencapsulated naringin and microencapsulated limonin, wherein the naringin contributes at least 60% by weight of the total amount of citrus phytochemical in the microencapsulated citrus phytochemical composition;
unencapsulated naringin in an amount up to 150 mg per 8 oz serving, and
unencapsulated limonin in an amount up to 3.0 mg per 8 oz serving;
wherein the amount of microencapsulated naringin is 2-20 times greater than the amount of unencapsulated naringin; and
wherein the amount of microencapsulated limonin is 2-20 times greater than the amount of unencapsulated limonin.

12. The beverage of claim 11 wherein the microencapsulated citrus phytochemical composition comprises an encapsulant shell comprising at least one of protein and a polysaccharide.

13. The beverage of claim 12, wherein the protein comprises at least one of dairy proteins, whey proteins, caseins and fractions thereof, gelatin, corn zein protein, bovine serum albumin, egg albumin, grain protein extracts, wheat protein, barley protein, rye protein, oat protein, vegetable proteins, microbial proteins, legume proteins, proteins from tree nuts, and proteins from ground nuts.

14. The beverage of claim 12, wherein the polysaccharide comprises at least one of pectin, carrageenan, alginate, xanthan gum, modified celluloses, carboxymethylcellulose, chitosan, gum acacia, gum ghatti, gum karaya, gum tragacanth, locust bean gum, guar gum, psyllium seed gum, quince seed gum, larch gum, arabinogalactans, stractan gum, agar, furcellaran, modified starches, gellan gum, and fucoidan.

15. The beverage of claim 11, wherein the grapefruit juice is included in an amount of at least 50% by weight of the beverage.

16. The beverage of claim 11, wherein the unencapsulated naringin is present in an amount of not more than 120 mg per 8 oz serving of the beverage.

* * * * *